United States Patent [19]

Young

[11] 4,398,211
[45] Aug. 9, 1983

[54] SOLID STATE OPTICAL MICROSCOPE

[76] Inventor: Ian T. Young, Pleasanton, Calif., granted to U.S. Department of Energy under the provisions of 42 U.S.C. 2182

[21] Appl. No.: 222,866

[22] Filed: Jan. 7, 1981

[51] Int. Cl.³ .............................................. H04M 7/18
[52] U.S. Cl. ..................................... 358/93; 358/107; 358/213
[58] Field of Search .................. 358/93, 107, 213, 903

[56] References Cited

U.S. PATENT DOCUMENTS

| | | | |
|---|---|---|---|
| 3,830,972 | 8/1974 | McHugh et al. | 358/213 |
| 3,869,572 | 3/1975 | Carter | 358/213 |
| 3,956,034 | 5/1976 | Micolay | 148/178 |
| 3,996,600 | 12/1976 | Patrin | 357/30 |
| 4,031,315 | 6/1977 | Pfleidover | 358/212 |
| 4,156,819 | 5/1979 | Collins et al. | 307/221 D |
| 4,188,642 | 2/1980 | Morishita | 358/213 |
| 4,193,093 | 3/1980 | St. Clair | 353/160 |
| 4,242,703 | 12/1980 | Tsuboshima | 358/213 |
| 4,245,240 | 1/1981 | Tanaka | 358/213 |
| 4,298,887 | 11/1981 | Rode | 358/213 |

OTHER PUBLICATIONS

Amelio, "Charge Coupled Devices", *Scientific American*, 230, 23-31, (1974).
Boyle et al., "Charge-Coupled Semiconductor Devices", *The Bell System Technical Journal*, 4-1970, 587-593.
Reticon Corporation, "Charge-Coupled Photo Diode Arrays", CCPD-256, CCPD-1024, CCPD-1723.

*Primary Examiner*—Robert L. Griffin
*Assistant Examiner*—Edward L. Coles
*Attorney, Agent, or Firm*—Paul Davis; Clifton E. Clouse, Jr.; Richard G. Besha

[57] ABSTRACT

A solid state optical microscope wherein wide-field and high-resolution images of an object are produced at a rapid rate by utilizing conventional optics with a charge-coupled photodiode array. A galvanometer scanning mirror, for scanning in one of two orthogonal directions is provided, while the charge-coupled photodiode array scans in the other orthogonal direction. Illumination light from the object is incident upon the photodiodes, creating packets of electrons (signals) which are representative of the illuminated object. The signals are then processed, stored in a memory, and finally displayed as a video signal.

7 Claims, 2 Drawing Figures

SOLID STATE OPTICAL MICROSCOPE

The U.S. Government has rights in this invention pursuant to Contract No. W-7405-ENG-48 between the U.S. Department of Energy and the University of California.

BACKGROUND OF THE INVENTION

The present invention relates generally to optical microscopes, and more particularly to solid state optical microscopes.

Optical microscopes are typically designed with the human eye serving as a limiting factor. For example, the human eye is able to distinctly resolve only approximately 800 to 1,000 points per line on the width of a normal visual field. Because of this limitation, optical microscopes generally provide a resolvability only in this range. Optical microscopes coupled to electronic detectors are not new. In one such typical microscope, a point of light from the viewed object is defocussed and then made incident on a photomultiplier which is coupled to electronic processing means. Microscopes of this type provide a high signal-to-noise ratio, but the generation of digitized signals to provide an image of the object is exceedingly slow. In another microscope, a vidicon tube provides electronic representation of the microscope image, with the subsequent digitized signals generated at a high rate. However, the signal-to-noise ratio is compromised. In both types of microscope systems, the resolution characteristic of the total system is still limited to approximately 800 points per line.

The use of charge-coupling with optical microscopes, and in particular, the use of charge-coupled photodiodes with optical microscopes, is a unique feature of this invention. Such a combination with a high-resolution lens provides a wide field microscope with high resolution and a rapid data generation rate, such that the number of resolvable points per line is significantly improved, and is greater than 3,000.

Charge-coupling, as customarily defined, relates to the collective transfer of all the mobile electric charge stored within a semiconductor storage element to a similar, adjacent storage element by the external manipulation of voltages. The quantity of the stored charge in this mobile "packet" can vary widely, depending on the applied voltages and on the capacitance of the storage element, and the amount of electric charge in each packet can represent information. A more detailed description of charge-coupling is described by G. Amelio in *Scientific American* 230, pp. 23–31 (1974), incorporated herein by reference.

SUMMARY

It is an object of the invention to provide a wide field, high resolution, high signal-to-noise ratio, optical microscope.

Another object of the invention is to provide a solid state optical microscope utilizing one or more charge-coupled photodiode arrays (CCPD).

Still another object of the invention is to provide an optical microscope in combination with charge-coupled photodiode arrays, which provide more than 3,000 resolvable points per line.

Additional objects, advantages, and novel features of the invention will be set forth in part in the description which follows; and in part will become apparent to those skilled in the art upon examination of the following; or may be learned by practice of the invention. The objects and advantages of the invention may be realized and attained by means of the instrumentalities and combinations particularly pointed out in the appended claims.

To achieve the foregoing and other objects, and in accordance with the purpose of the present invention as embodied and broadly described herein, the solid state optical microscope of this invention may comprise means for illuminating an object, thereby producing, along an imaging path, image light propagating through or emanating from the object. Means for supporting the object are also provided. Disposed along the imaging path is an imaging lens to provide refraction of the image light. A multiphase clock source is coupled with a charge-coupled photodiode array, hereinafter referred to as a CCPD, disposed aong the imaging path. The CCPD serves to accumulate charges which correspond to the imaging light during periods determined by the clock source. Readout means coupled to the CCPD are used to obtain a video signal which corresponds to the accumulated charges from the CCPD.

In a further aspect of the present invention, in accordance with its objects and purpose, the solid state optical microscope may comprise means for illuminating the object viewed, producing, along a first imaging path, image light propagating through or emanating from the object. Means for supporting the object are provided. Additionally, means for serially scanning the object in one of two orthogonal (x or y) directions at a variable frequency are disposed along the first imaging path, and transmits the image light to a second imaging path. A beam splitter is disposed along the second imaging path, and substantially splits the image light into a first half-image light along a third imaging path, and a second half-image light along a fourth imaging path. A multiphase clock source having an adjustable frequency is provided, and a first CCPD is disposed along the third imaging path. The first CCPD scans in the orthogonal direction not scanned by the scanning means during periods determined by the clock source. A second CCPD is disposed along the fourth imaging path, and serves to accumulate charges and produce a second signal which corresponds to the intensity of the second image light. The second CCPD also scans in the orthogonal direction not scanned by the scanning means during periods determined by the clock source. Means, coupled to the first and second CCPDs, are provided for processing the first and second signals received therefrom. A memory, coupled to the processing means, stores the processed signals received from the processing means, and stores programmed instructions. Coupled to the memory and the master clock is a central processing unit which fetches and executes the programmed instructions from the memory, and responds to external control signals. A video image of the object is displayed on means coupled with the memory.

The solid state optical microscope disclosed herein provides a wide viewing field with high resolution. More than 3,000 resolvable points per line are obtainable, compared with 800 to 1,000 resolvable points per line, typical of currently available optical microscopes. Additionally, the rate at which displayed images of the object are presented is much greater than with currently known optical microscopes.

DESCRIPTION OF THE DRAWINGS

The accompanying drawings, which are incorporated in and form a part of the specification, illustrate an embodiment of the present invention, and, together with the Description, serve to explain the principles of the invention. In the drawings.

DETAILED DESCRIPTION OF THE INVENTION

Reference will now be made in detail to the present preferred embodiment of the invention, an example of which is illustrated in the accompanying drawings.

Figure 1:
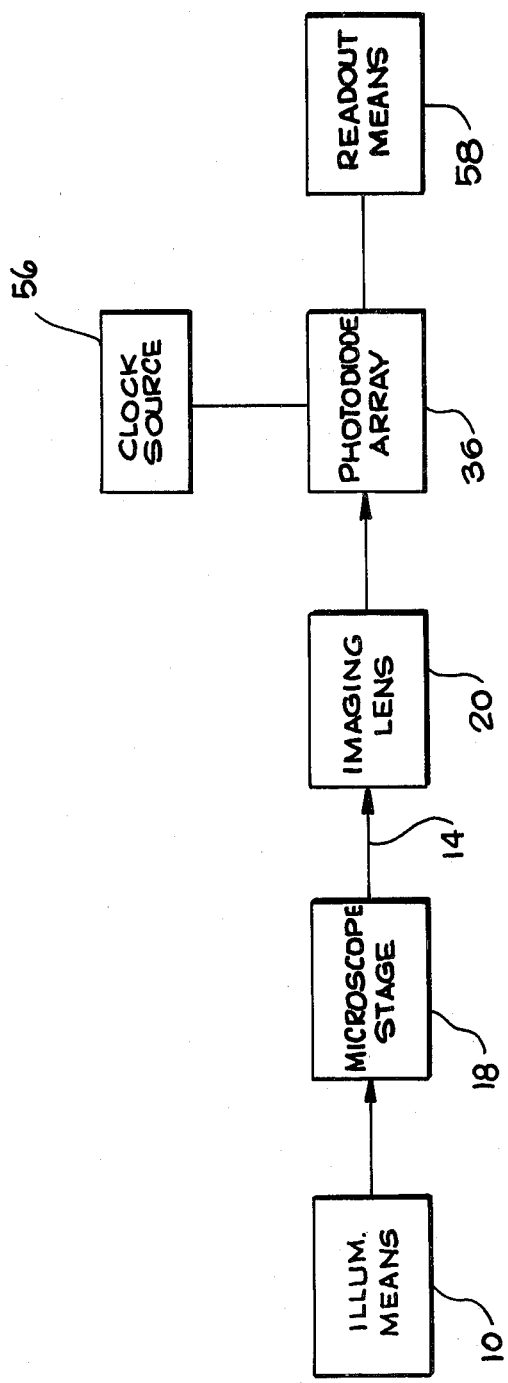
FIG. 1 represents a block diagram of a solid state optical microscope representing a single embodiment of the invention.

A block diagram of the invention is illustrated in FIG. 1. As shown, means 10 for illuminating the object to be viewed are provided. Such means may include an ordinary incandescent bulb, a quartz halogen bulb, or a high pressure mercury vapor lamp. Means 18 for supporting the viewed object are included. For this purpose, a microscope stage, moveable either manually or mechanically, is utilized. As shown in FIG. 1, illumination of the object produces image light propagating through or emanating from the viewed object along an imaging path 14. An imaging lens 20 disposed along imaging path 14 refracts the image light. The refracted image light is caused to fall on a CCPD which is preferably arranged in a linear array of diodes. An example of such a CCPD is the commercially available Reticon CCPD-1728. CCPD 36 is disposed along imaging path 14, and serves to accumulate charges corresponding to the imaging light during periods of time which have been determined by a multiphase clock source 56 electrically coupled to the CCPD 36. Each individual photodiode responds and corresponds to a different spatial point of the image light, and a video signal of the viewed object is projected from a readout means 58. The video signal is determined from voltages corresponding to the accumulated charges generated in CCPD 36. Such readout means can include a cathode ray display.

Figure 2:
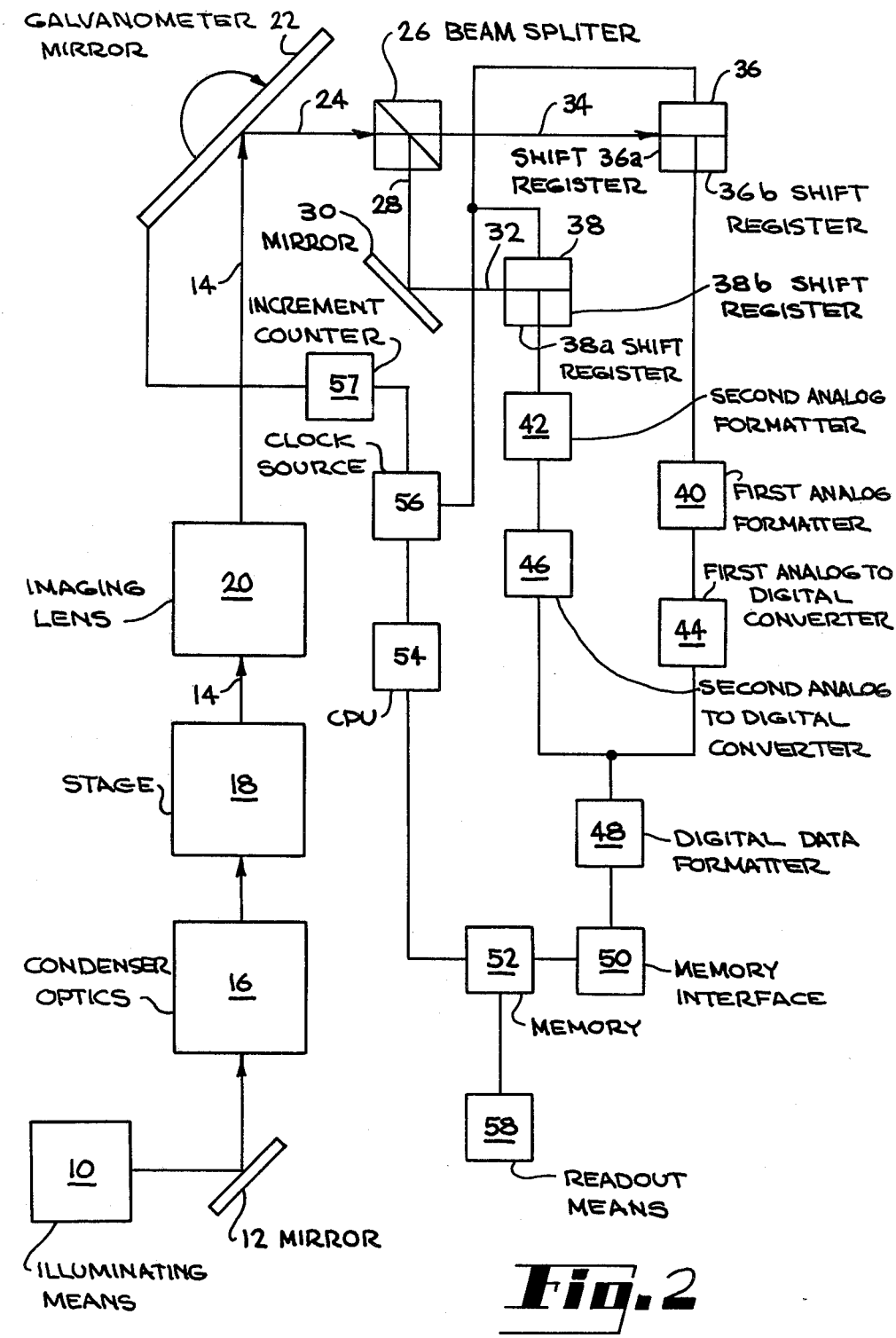
FIG. 2 is a block diagram of a solid state optical microscope in greater detail than FIG. 1, and represents a preferred embodiment of the invention.

With reference now to FIG. 2, illumination means 10 provides the illumination necessary to produce the image light of the object positioned on stage 18. The object can be illuminated from above or below, and as illustrated, one embodiment utilizes a mirror 12 to direct the illumination to the object positioned on stage 18. Condenser optics 16 are included intermediate the mirror 12 and the stage 18 to collimate and condense the illumination, and a uniformly illuminated region of approximately 2 mm in diameter is produced. If the object viewed is greater than 2 mm, it is necessary to move stage 18 along the image path to permit complete viewing. This can be accomplished either manually by the operator, or mechanically.

In the preferred embodiment of the invention, imaging lens 20 has the following characteristics: a focal length of 29.5 mm; standard magnification of 25 x; 546 $\mu$m (e-line) standard wavelength; 1,250 lines/mm aerial resolving power; 2 mm $\phi$ object area; and 50 mm $\phi$ image area. The lens used is commercially available; however, other lenses having high resolving power are equally applicable to the invention.

As previously discussed, the stage itself is capable of movement, thereby permitting "gross" scanning of the object. If, however, it is desired to scan that portion of the object found within the 2 mm illuminated region, means 22 are provided for scanning the object in either one of two orthogonal directions. To this end, a galvanometer-scanning mirror 22, disposed along first imaging path 14, is provided. Galvanometer mirror 22 is electronically coupled with multiphase clock source 56 which controls its rate of turning, and hence its scanning rate. Mirror 22 serially scans the object and reflects image light along a second imaging path 24 for ultimate transmission to CCPDs 36 and 38. Clock source 56 sends a pulse to increment counter 57, which is constructed from commercially available circuits. The number in the counter is in turn converted to a voltage, which, when applied to galvanometer mirror 22, causes mirror 22 to move.

The image light propagating from each spatial position in the object can be divided into discrete brightness levels. Each point on the object viewed which is illuminated has a particular brightness level. Although the preferred embodiment of the invention utilizes 256 brightness levels, other numbers of levels could be employed. For objects which are relatively dark, the movement of mirror 22 can be slowed, thereby permitting more photons of energy to be accumulated. Conversely, if the viewed object is relatively bright, mirror 22 is caused to scan at a quicker rate.

Image light reflected by mirror 22 travels along the second image light path 24 to a beam splitter 26 disposed along second imaging path 24. The beam splitter substantially splits the image light into a first half-image light and a second half-image light. The first half-image light is reflected along a third imaging path 34, while the second half-image light is reflected along a fourth imaging path 28. Disposed along fourth imaging path 28 is a mirror 30, to direct the imaging light along fifth imaging path 32. The first half-image light is incident upon CCPD 36 disposed along third imaging path 34. The second half-image light is incident upon second CCPD 38 disposed along fifth imaging path 32. Although arrays 36 and 38 are both arranged linearly, other geometric configurations are possible. The image light falling on either CCPD 36 or CCPD 38 is incident on a silicon surface.

Silicon is highly sensitive to visible and near-infrared radiation. When the image light from the viewed object falls on a silicon substrate such as a photodiode, the radiation is absorbed, and results in the generation of electrons in a quantity proportional to the amount of incident light. Packets of electrons generated by the image light are converted to an electrical signal representative of the image light incident on the photodiodes. Each array of photodiodes is comprised of silica, and collects photons of energy corresponding to the brightness level of the image light, creating packets of electrons. CCPDs 36 and 38 not only serve to transform the image light to electron packages, but also to electronically scan that portion of the object on stage 18 within the 2 mm illumination region. CCPDs 36 and 38 scan in the orthogonal direction not scanned by mirror 22. Again, the scanning time is controlled by multiphase clock source 56.

In the preferred embodiment of the invention, CCPDs 36 and 38 each contain 1728 photodiodes and two charge-coupled device shift registers 36a, 36b, 38a, 38b, per CCPD, each containing 864 storage locations.

Shift registers 36a and 38a receive charges from the even-numbered diodes, while shift registers 36b and 38b receive charges from the odd-numbered photodiodes from the respective CCPDs. At the end of each integration period, determined by clock source 56, the packets of electrons of each array are switched through transfer gates into one of the charge-coupled device shift registers. Odd numbered photodiodes from an array are switched into one register, and the even photodiodes into the other. Immediately after this parallel transfer, a new integration period begins. Although two CCPDs are utilized in the preferred embodiment, one CCPD is possible. Additionally, more than two could be employed if greater magnification is desired.

The signals from CCPDs 36 and 38 are transferred to means for processing the signals. Included in the processing means are first and second analog formatters 40 and 42, first and second analog-to-digital converters 44 and 46, digital data formatter 48, and memory interface 50. Formatter 40 combines the odd and even signals generated by CCPD 36, amplifies the signals, and provides balance between the odd and even channels, resulting in a first combined signal. Formatter 42 performs an analogous function for CCPD 38, and results in the generation of a second combined signal. Formatters 40 and 42 in turn are coupled with first and second analog-to-digital converters (A/D) 44 and 46, respectively. (A/D) converters 44 and 46 digitize and quantitate each combined signal into one of 256 brightness levels. Coupled with converters 44 and 46 is a digital data formatter 48, which combines the signals from A/D converters 44 and 46 to yield a composite signal representative of the object on stage 18 which is illuminated and viewed.

The total number of bits of information per line, e.g., signals corresponding to brightness level, is so tremendously large that it is convenient to sample only part of the signals transmitted from converters 44 and 46, e.g., a subwindow of the total window having 3456 by 3456 picture elements per line, resulting from CCPDs 36 and 38. The number of bits of information fed into formatter 48 is usually too large for most computer memory systems which are economically available. Selection of only a portion of these bits by formatter 48 provides a representative picture of the object on stage 18, and yet does not overload memory 52. In the preferred embodiment of the invention, the digital image acquired is a square of 3456 picture elements per line for a total of 11,943,936 picture elements generated per picture. Formatter 48 selects a subwindow having 256 by 256 picture elements per line for a total of 65,536 picture elements.

Coupled with formatter 48 and memory 52 is memory interface 50, which provides the means for getting the selectively chosen composite signal into memory 52. Memory 52 contains programmed instructions, and serves to store the composite signals representative of the object viewed, which are then displayed on display means 58. Display means 58 may be a cathode ray tube. Coupled to clock source 56 and memory 52 is a central processing unit (CPU) 54, which serves to execute programmed instructions stored in memory 52, such as the selection of the 256 by 256 dimensional subwindow, and the determination of the integration time to thus provide well-illuminated high contrast images.

The invention as described herein provides 3,456 resolvable points per line. Each picture element is acquired in 100 ns (10 MHz) and corresponds to 0.64$\mu$ per picture element. Assuming tightly packed, non-overlapping cells or objects with a diameter of 5$\mu$ are viewed, 165×10$^3$ cells per second can be acquired at a rate of 6$\mu$ sec per cell. If the diameter is 50$\mu$, 1.65×10$^3$ cells per second are acquired at a rate of 600$\mu$ sec per cell.

The foregoing description of a preferred embodiment of the invention has been presented for purposes of illustration and description. It is not intended to be exhaustive or to limit the invention to the precise form disclosed, and obviously many modifications and variations are possible in light of the above teaching. For example, although the preferred embodiment utilizes two distinct linear arrays, each containing 1728 photodiodes, one array or more than two with a varying number of photodiodes may be employed. Additionally, the arrays need not be linear. The embodiment was chosen and described in order to best explain the principles of the invention and its practical applications, to thereby enable others skilled in the art to best utilize the invention in various embodiments and with various modifications as are suited to the particular use contemplated. It is intended that the scope of the invention be defined by the claims appended hereto.

What is claimed is:

1. A solid state optical microscope, comprising:
  (a) means for illuminating an object, thereby producing, along a first imaging path, image light propagating from said object;
  (b) means for supporting said object;
  (c) means for serially scanning said object in either one of two orthogonal directions, said scanning means being disposed along said first imaging path, and transmitting said image light to a second imaging path;
  (d) an imaging lens disposed along said first imaging path between said object and said scanning means, said imaging lens providing refraction of said image light;
  (e) a beam splitter disposed along said second imaging path, said beam splitter substantially splitting said image light into a first half-image light along a third imaging path, and a second half-image light along a fourth imaging path;
  (f) a multiphase clock source having an adjustable frequency;
  (g) a first charge-coupled photodiode array, said first array being coupled with said clock source and disposed along said third imaging path, said first array serving to accumulate charges and produce a first signal corresponding to the intensity of said first image light and scan in the orthogonal direction not scanned by said scanning means during periods determined by said clock source;
  (h) a second charge-coupled photodiode array, said second array being coupled with said clock source and disposed along said fourth imaging path, said second array serving to accumulate charges and produce a second signal corresponding to the intensity of said second half-image light and scan in the orthogonal direction not scanned by said scanning means during periods determined by said clock source;
  (i) means for processing said first and second signals, and means being coupled to said first and second arrays;
  (j) a memory coupled to said processing means for storing said processed signals received from said processing means, and storing programmed instructions that set parameters which determine the scanning rates of said scanning means and said first and second arrays; and (k) means for displaying a video image characteristic of said object, said means being coupled with said memory.

2. The solid state optical microscope as defined in claim 1, wherein said illuminating means comprises a high pressure mercury vapor lamp.

3. The solid state optical microscope as defined in claim 1, wherein said serially scanning means comprises a galvanometer scanning mirror.

4. The solid state optical microscope as defined in claim 1, wherein said means for displaying a video image comprises a cathode ray tube.

5. The solid state optical microscope as defined in claim 1, wherein said first and second arrays each have even- and odd-numbered photodiodes which distinctly produce an odd signal from said odd-numbered photodiodes for each of said arrays, and an even signal from said even-numbered photodiodes for each of said arrays.

6. The solid state optical microscope as defined in claim 5, wherein said processing means comprises:

(a) a first analog formatter coupled to said first array for balancing, amplifying, and combining said odd and even signals from said first array, forming a first combined signal;

(b) a second analog formatter coupled to said second array for balancing, amplifying, and combining said odd and even signals from said second array, forming a second combined signal;

(c) a first analog-to-digital converter coupled to said first analog formatter to provide digitization and quantization of said first combined signal;

(d) a second analog-to-digital converter coupled to said second analog formatter to provide digitization and quantization of said second combined signal; and (e) a digital data formatter coupled to said first and second analog-to-digital converters for purposes of combining said signals received from said first and second analog-to-digital converters, forming a composite signal, and permitting the selection of a subwindow of said composite signal to be displayed on said display means.

7. The solid state optical microscope as defined in claim 6, wherein said programmed instructions in said memory additionally permit the selection of said subwindow of said composite signal.

* * * * *